United States Patent [19]

Paton et al.

[11] Patent Number: 5,070,225
[45] Date of Patent: Dec. 3, 1991

[54] METHOD FOR OVERHEAD SUBMERGED ARC WELDING AND APPARATUS TO IMPLEMENT THE SAME

[75] Inventors: Boris E. Paton; Vladimir V. Podgaetsky; Pavel A. Varenchuk; Nikolai T. Privalov; Vladimir I. Galinich; Valentin D. Kovalev; Yaroslav A. Romanenko, all of Kiev, U.S.S.R.

[73] Assignee: Institut Elekctrosvarki Imeni E. O. Patona Akademii Mauk Ukrainskoi SSR, Kiev, U.S.S.R.

[21] Appl. No.: 460,926
[22] PCT Filed: Dec. 14, 1988
[86] PCT No.: PCT/SU88/00263
  § 371 Date: Feb. 6, 1990
  § 102(e) Date: Feb. 6, 1990
[87] PCT Pub. No.: WO89/11945
  PCT Pub. Date: Dec. 14, 1989

[30] Foreign Application Priority Data

Jun. 6, 1988 [SU] U.S.S.R. ............................ 4429057

[51] Int. Cl.[5] .............................................. B23K 9/18
[52] U.S. Cl. ...................................... 219/73; 219/73.2
[58] Field of Search ................................ 219/73, 73.2

[56] References Cited

U.S. PATENT DOCUMENTS 4,153,832 5/1979 Iio .

FOREIGN PATENT DOCUMENTS 3425225 2/1986 Fed. Rep. of Germany .
469554 7/1975 U.S.S.R. .
1353594 11/1987 U.S.S.R. .
1397235 5/1988 U.S.S.R. .
1564295 4/1980 United Kingdom .

Primary Examiner—Clifford C. Shaw
Attorney, Agent, or Firm—Lilling & Lilling

[57] ABSTRACT

The invention relates to technology and equipment for arc welding.

A method of overhead submerged arc welding consists in that flux at the welding site is pressure-fed to the joint being welded from below at different pressures along the joint being welded, a consumable electrode (3) is fed through the flux (3) from below and an arc is struck. A weldpool is formed thereat with a layer of liquid slag. The joint is welded by feeding the flux (A) on the section (A) before the arc relative to the weld being formed under a constant pressure, needed to provide conditions for pressuring the weldpool, and on the section of the arc burning and the weldpool location pressure is exercised through a layer of flux and a layer of liquid slag, the bulk of the flux being pressure-fed to the zone of the weldpool formation and the pressure gradually built up in a manner that its maximum value is distributed along the boundary of the section of the beginning of the weld solidification and maintained constant all along the boundary of solidification. Then solidification is effected and the weld is formed.

There is also proposed an apparatus to implement the method.

The invention may be used for welding longitudinal and circumferential rotatable joints.

5 Claims, 2 Drawing Sheets

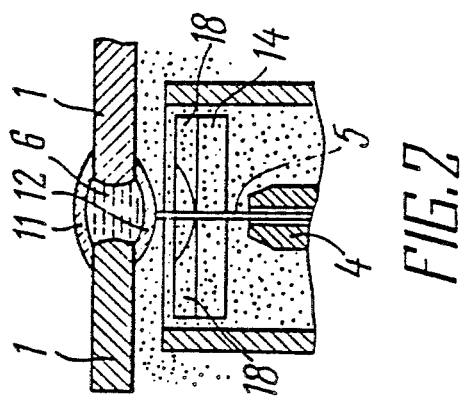
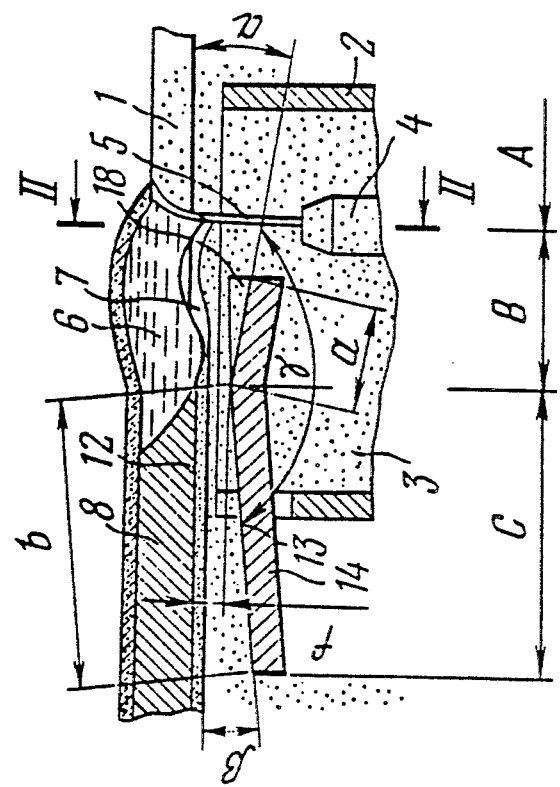

METHOD FOR OVERHEAD SUBMERGED ARC WELDING AND APPARATUS TO IMPLEMENT THE SAME

FIELD OF THE INVENTION

1. Background of the Invention

The present invention relates to arc welding, and more specifically, to a method for overhead submerged arc welding and apparatus to implement the same.

2. Description of the Related Art

A large amount of work in producing welded structures is taken up by circumferential rotatable welds of hollow articles with limited access on the inside to the joints being welded. The latter include circumferential joints of closed vessels, reservoirs and housings, circumferential joints of pipelines, field welds and slots in the outer plating of ships' hulls; longitudinal welds of large-area articles which are quite difficult to manouver into a position convenient for welding. They also include joints of panels which are difficult to manipulate, and also joints of segments, three-dimensional and flat sections etc.

The method of overhead submerged arc welding is characterized by that the weldpool, as compared with downhand submerged arc welding, is sort of turned by 180°, the flux and the electrode being fed in the vertical upward direction. Incidentally, the electrode is fed through a compacted layer of flux.

That is why the method is called overhead welding.

It is also called the submerged arc welding, because the arc burns in the thick of metal.

Such kind of welding produces so-called overhead welds.

Overhead welds may be of different types, e.g. overhead root welds and overhead back-up welds. There may also be overhead single-pass welds and other types of overhead welds.

Overhead root welds are those which are the first to be run in welding a joint and located in the upper part of the joints being welded on the side opposite to that of the electrode feed. Subsequent welding, i.e. making subsequent welds, is performed by any method known in the art, the electrode being fed from the same direction as in making overhead root welds, e.g. internal root welds in circumferential rotatable joints of vessels, reservoirs, connections of ships' outer bottom plating and other articles.

Overhead root arc welding makes it essentially possible to omit circumferential rotatable welding inside vessels and welding in hardly accessible spaces in making rectilinear welds in structures with limited access on the side opposite to the ceiling.

Overhead back-up welds are those which are the first to be run in making a joint and located in the lower part of the sections being welded on the side closest to that of the electrode feed. Subsequent welding is performed by any method known in the art, with the electrode being fed from the side opposite to that compared with overhead root welding.

Root welds are practically used in welding overhead circumferential and longitudinal joints of articles with limited access on the inside, and backup welds are used in welding longitudinal joints of hardly manoeuverable articles, e.g. sheet structures made of segments and other articles.

Overhead single-pass welds are those used in making limited-width joints and located on the whole section being welded. Characteristically, subsequent welding of the joint on either side is not required.

Molding a ready-made weld presents many problems in making back-up and single pass welds.

In overhead welding, the molten flux and metal of the weldpool produced by burning of the arc as a result of melting of the welded metal, electrode material and welding flux are held from beneath by a crust of partially molten flux and by the action of molding devices. The latter may be of different shapes and sizes and made in the form, for instance, of plates, shoes and back-up plates and other structural elements.

The flux is pressed from beneath to the welding spot, the expended amount being constantly replenished in the welding process. To mold the upper portion of the weld, the flux may be fed both from the bottom through the gap between the edges of the article being welded and from the top, by any known method, with a loose layer of flux being formed in the process. Back-up plates or flux-holding arrangements may also be used for the purpose.

The greatest number of problems arises in welding of large-size articles having the shape of a cylinder or approximating it, e.g. the hulls of ships and boiler unit casings, which require a particularly high quality of welds and which must turn about their axes in the process of welding, and also in welding large-size flat articles which are difficult to handle.

Known in the art is a method of overhead submerged arc welding (SU, A, 469,554), whereby the flux and the electrode are fed from below the joint, the flux pressure being adjusted all along the joint with the use of a special plate. The maximum flux pressure with the foregoing welding method used is built up behind the arc.

With this method applied, however, the maximum flux pressure is registered behind the arc at a distance larger than the length of the weldpool, which affects the welding process, as the weld metal gradually presses of the adjusting plate.

Said prior art method is materialized in an apparatus, comprising a means for feeding and pressing the flux to the welded article and a welding tip with a consumable electrode located inside the flux feeding means. The latter houses an adjusting plate, whose position is regulated with respect to the joint.

The operator using this apparatus observes the joint produced and adjusts the plate inclination angle to keep the requisite flux pressure in the event the joint forming parameters, e.g. the gap between the edges of the article, deviate from the standard. To obtain a high-quality overhead weld, it is essential to strictly keep to the prescribed flux pressure.

Welding with the use of said apparatus calls for constant change in the position of the adjusting plate. This, in turn, requires the operator's unremitting attention and a high professional level.

Thus, the quality of the weld being formed with the use of the above apparatus depends on the operator's skill and experience which is often conducive to impaired quality of the weld.

There is another prior art method of overhead submerged arc welding (DE, C, 3,125,225), whereby the flux is pressure-fed from below the joint, a consumable electrode is fed to the joint through the flux from beneath and an arc is struck, whereupon a weldpool is formed and the joint is welded with subsequent solidification of the weldpool and molding of the weld, and the flux is fed from below the joint with different pressures applied at different sections along the joint, the flux before the arc with respect to the weld being formed is fed under a prescribed constant pressure essential for providing conditions favorable for pressing the weldpool, whereas on the section of arc burning and weldpool location the flux is supplied under a pressure necessary to keep the weldpool at the level of the joint being welded, said pressure being constantly increased all along the weldpool so that the maximum flux pressure is applied to the section of the beginning of the weld solidification.

Such a method of overhead submerged arc welding permits optimum distribution of prescribed pressures on different sections along the joint being welded, which makes it possible to reliably keep the weldpool at the level of the joint and form high-quality welds with the requisite reinforcement on the inside of the weld (on the side opposite to the ceiling), e.i. in welding overhead root joints.

The welds thus made have deviations in the molding of the outside of the newly-made weld in the form of unevenness, undercuts, local variations in the weld width and other deviations.

Such deviations in the molding of the outside of the weld stem from insufficient effect of the flux and the molding device on the weld in the area of the beginning of the weld solidification, i.e. at the place of the flux maximum pressure.

This method of overhead arc welding is materialized in an apparatus, comprising a means for feeding and pressing the flux to the joint being welded and a welding tip with a consumable electrode, placed inside the means for feeding the flux, the inside of the means enclosing an adjusting plate adjustable with respect to the joint being welded to build up the requisite pressure in the area of the joint. The adjusting plate has a fold which divides it into two parts, "a" and "b", the fold being located under the section of the beginning of the weld solidification to produce maximum flux pressure at the given section. The part "a" of the adjusting plate, located on the side of the weldpool, has a length practically equal to the length of the weldpool and is fitted under an angle α to the surface of the joint being welded, thereby assuring the requisite pressure of the flux upon the weldpool to keep the latter at the level of the joint. The part "b" of the adjusting plate, located on the side of the weld being molded, extends to the section of final molding of the weld and is fitted under an angle β to the surface of the joint being welded to assure the requisite pressure upon the layer of liquid slag being fed on the section of the weld formation, from the maximum—in the area of the beginning of the weld solidification, to the minimum—at the section of the final weld molding.

Such an apparatus allows overhead welding to be carried out under optimal process conditions, specifically, it makes it possible to correctly distribute and stabilize the prescribed pressure at each individual section, A, B, C along the joint being welded (before the arc, in the area of the arc and the weld-pool and in the location of molding a newly-made weld). However, at the section of the beginning of solidification, having a smaller length and actually presenting the boundary between the section B of the arc burning and the weldpool, and the section C of the weld molding, deviations in the molding of the external side of the weld are due to insufficient effect at this section of the flat inclined section "a" of the adjusting plate, with the fold line thereof being located essentially at a distance equal to the length of the weldpool.

And as the section of the beginning of the weld molding (the boundary of the weldpool solidification) is arranged on the contour of the end portion of the weldpool, the flat section "a" located thereunder fails to ensure at the maximum flux pressure section a constant flux pressure all along this contour (boundary) of solidification.

This results in that in the process of welding at the section of the maximum flux pressure the pressure of the flux is uneven on the whole boundary of the weldpool solidification, which gives rise to the foregoing unevenness, undercuts, and local variations in the weld width and other deviations in the reinforcement on the outside of the weld.

The above-mentioned deviations in molding the external side of the weld have an adverse effect upon the molding of the overhead weld as a whole, i.e. both on the inside and outside, and causes difficulties in the molding of welds whenever a very high quality of weld molding is required, e.g. in articles wherein the welds are subsequently covered with enamel, i.e. coated simultenaously with the entire article, etc.

SUMMARY OF THE INVENTION

The present invention aims to provide a method for overhead submerged arc welding and an apparatus to implement the same, in which through selecting and distributing the pressure of flux at the boundary of the crystallized weld it would be possible to ensure a high quality of a newly-made weld with the required high quality of reinforcement on both sides of the weld.

The foregoing aim is accomplished by a method of overhead submerged arc welding whereat is pressure-fed to the joint from below, through which a consumable electrode is then fed from below, an arc is struck, a weldpool is formed and the joint is welded with subsequent solidification of the weldpool and molding of a weld, the flux being fed at different pressures on different sections along the joint being welded, on the section before the arc relative to the weld being formed the flux is fed under a constant prescribed pressure needed to provide conditions for pressuring the weldpool, and on the section of arc burning and weldpool location pressure is exercised through a layer of flux and a layer of liquid slag, which is gradually built up so that the maximum pressure of flux is applied to the section of the beginning of the solidification. According to the invention, the bulk of the flux is pressure-fed to the zone of the weldpool formation and the maximum flux pressure formed thereat is distributed along the boundary of the section of the beginning of the weld solidification, the value of said pressure being maintained constant all along the boundary of solidification.

Such method of overhead arc welding allows correct feeding of the bulk of the flux to the zone of the weldpool formation, optimal production of a maximum flux pressure distributed on the boundary of the section of the beginning of the weld solidification, and then maintenance of the value of said pressure at a constant level all along the boundary of solidification. All this promotes optimum conditions for performing overhead welding at different sections along the joint being welded and molding of high-quality welds.

Besides, implementing said method produces a positive effect on the stabilization of pre-assigned parameters of the process of overhead submerged arc welding, which makes it possible to obtain high-quality overhead welds.

Also, all operations in the method are simple to perform and easy to be fully automated.

Welding in the optimum conditions with stable parameters of the process allows more rational use of welding materials, and is conductive to their economy. Moreover, the pre-assigned requirements of the process are maintained with a high degree of accuracy.

It is expedient that in making back-up and single-pass welds the maximum flux pressure be distributed essentially on a parabola with the axis of symmetry thereof arranged in a vertical plane passing through the longitudinal axis of symmetry of the weld.

This permits optimum concentration of the maximum flux pressure on the boundary of the section of the beginning of solidification, essentially approximate it to the shape of the line of the weldpool solidification (in its tail part) and thus obtain optimum conditions for high-quality molding of overhead joints.

The foregoing object is also accomplished by an apparatus for implementing the method, comprising a means for feeding and pressing the flux to the joint being welded, a welding tip with a consumable electrode, located inside the means for feeding and pressing the flux to the joint being welded, an adjusting plate to produce different pressures on different sections along the joint being welded, the plate being adjustable relative to the joint being welded inside the means for feeding and pressing the flux to the joint being welded, the adjusting plate on the side of the joint being welded being made in the form of two intersecting sections, arranged at an angle to the joint being welded, with the apex thereof located under the section of the beginning of the weld solidification to produce the maximum flux pressure on said section, and a means for longitudinal displacement of the adjusting plate in the direction of welding in order to adjust the distance between the top of the adjusting plate and the welding tip. According to the invention, the section of the adjusting plate located under the weldpool has a variable-section recess in the transverse and longitudinal profiles with inclined walls to form and direct the flow of flux towards the zone of solidification of the weld-pool liquid metal, the edge of the recess facing the weldpool having a contour identical with the shape of the boundary of the weldpool solidification.

Such apparatus allows overhead welding to be performed under the optimum process conditions, i.e. it makes it possible to correctly distribute and stabilize the maximum flux pressure on the boundary of the weld solidification, which ensures a substantially improved quality of molding of both sides of the weld.

Besides, this apparatus makes it possible to extend the range of using the method to articles different in purpose (e.g. those intended for enamelling), shape, dimensions and configuration of the joints being welded (e.g. with or without grooving).

The apparatus is easy to operate and can be handled by personnel with any proficiency standard.

Working practically in the automatic mode, such apparatus does not require special monitoring of the operation of its components.

Furthermore, the number of operations to be supervised by the operator is considerably reduced.

All this makes it possible to substantially improve the quality of welded joints.

The apparatus is simple to manufacture, small in size and mass, and comparatively cheap. Being able to maintain practically all welding parameters at a constant level, the apparatus features higher welding quality than the prior art apparatuses.

It is preferably that in making back-up and single-pass welds the section of the adjusting plate arranged under the weldpool be provided with a recess in the shape of a parabola.

It is also advisable that in making back-up and single-pass welds on the section of the adjusting plate located under the weldpool two wedge-shaped intersecting projections be fitted, with the apices thereof arranged on the intersection of the inclined sections of the adjusting plate and having shaped cut-outs on their adjoining edges, forming on the working surface of the adjusting plate a variable-section recess with a cylindrical surface, tangent to the plane of said section of the adjusting plate on its generatrix and intersecting with the upper planes of the wedge-shaped projections on a parabola with the apex thereof arranged on the line of intersection of the inclined sections of the adjusting plate.

This permits optimum concentration of the flux maximum pressure on the boundary of the section of the beginning of the weld solidification, thereby favoring high-quality welds (particularly back-up and single-pass) through improvement in molding of reinforcement on both sides of the weld.

BRIEF DESCRIPTION OF THE DRAWINGS

The invention will now be explained in greater detail with reference to a specific embodiment thereof taken in conjunction with the accompanying drawings, wherein:

FIG. 1 is a schematic representation of an apparatus for overhead welding, according to the invention (longitudinal section);

FIG. 2 is the section II—II in FIG. 1;

Figure 3:
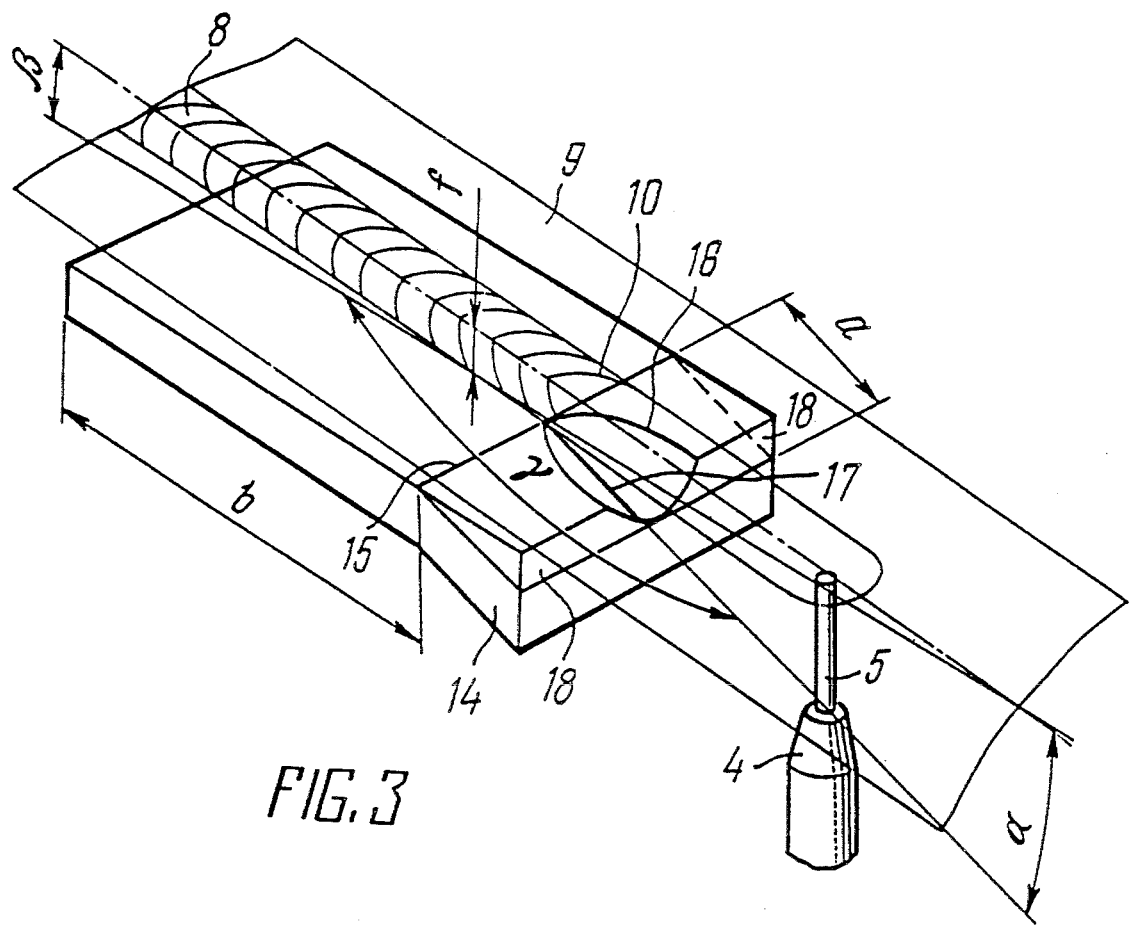
FIG. 3 is a diagram explaining the welding process (isometric projection)

The method, according to the invention, will be described with reference to FIGS. 1, 2 and 3, schematically showing the requisite elements of the apparatus to explain the method and the apparatus to implement the same.

DESCRIPTION OF THE PREFERRED EMBODIMENTS

The essence of the proposed method is as follows. For instance, flat metal sheets 1 (FIG. 1) to be welded may be components of totally different metal structures, e.g. a ship hull, which have limited access from the top and may be welded only in the overhead position. To this end, a flux 3 is fed and pressed by any method known in the art to the location of the joint to be welded with the aid of a means 2 for feeding and pressing the flux.

The inside of the means 2 houses a tip 4 (FIGS. 1, 2, 3) with a consumable welding electrode 5. The welding electrode 5 may be of any variety widely used in industry, its type being irrelevant to the essence of the invention.

To initiate the welding process, it is necessary to feed the electrode 5 to the joint to be welded, supply voltage to the electrode 5 (FIGS. 1, 2) and strike an arc. The arc striken, the metal of the sheets 1, the flux 3 and the material of the electrode 5 melt, to produce a weldpool 6.

Further action of the heat of the arc and the weldpool 6 promotes subsequent melting of the flux 3 and formation of liquid slag, a portion of which disposed under the weldpool 6, to form a so-called slag bath 7 acted upon by the bulk of the flux 3 in the process of welding.

In keeping with the processes taking place, the whole of the welding zone is technologically divided into several sections: a section A before the arc relative to a weld 8 being formed, a section B of the arc burning and location of the weldpool 6, which includes a section of the beginning of solidification of the weld 8 and a section C of molding the weld 8.

The weld 8 in FIG. 3 is shown schematically.

The flux 3 (FIGS. 1, 2) is fed from below the joint to be welded under different pressures on different sections A, B, C along the joint.

On the section A before the arc relative to the weld 8 being formed the flux is fed under a constant prescribed pressure essential for creating conditions for pressing the weldpool 6. The pressure of the flux 3 on the section A is preset on the basis of the welding mode chosen, the properties and geometry of the material being welded and the shape of the joint. Besides, the pressure of the flux 3 on the section A is kept constant.

On the section B, the bulk of the flux 3 is fed under a pressure capable of keeping the weldpool 6 at the level of the joint being welded, said pressure being constantly built up all along the weldpool 6 in a manner that the maximum flux pressure is applied on the whole boundary of the section of the beginning of solidification of the weld 8. The section of the beginning of solidification of the weld 8 is assumed to be the section of the beginning of transition of the melt in the weldpool 6 to the solid state, i.e. to the weld 8. The section of the beginning of solidification of the weld 8 is offset from the arc by a distance equal to the length of the weldpool (FIG. 1). The section of the beginning of solidification of the weld has a boundary which, on the side of the crater on the lower surface of the joint being welded, shown in FIG. 3 as a conventional plane 9, is arranged on a contour 10 and shaped as, for instance, a parabola. The vertex of such a parabola is also offset from the arc by a distance equal to the length of the weld-pool, and its axis of symmetry is located in a vertical plane passing through the longitudinal axis of symmetry of the weld.

The pre-assigned pressure on the section B is higher than that on the section A.

Higher pressure on the section B is explained by the necessity to maintain the melt in the weldpool 6 at the level of the joint being welded, considering the amount of flux which melts and cakes into a crust 11.

A layer of liquid slag is thereupon fed from below, out of the weldpool 7, to the section C of weld molding, and pressure is applied thereto, said pressure varying from the maximum value on the section of the beginning of solidification of the weld 8 to the minimum value on the section C, whereon the layer of the liquid slag hardens to form a slag film 12 (FIGS. 1, 2), and the weld 8 is molded.

The maximum pressure on the section of the beginning of solidification of the weld 8 is essential for maintaining the latter at the level of the joint being welded.

It is particularly important to apply and distribute the maximum pressure of the flux 3 on the boundary of the section of the beginning of solidification of the weld 8, as the molten metal in the weld-pool 6 begins to solidify and becomes highly viscous on this boundary, thereby putting up maximum resistance to the pressure applied thereto.

It is noteworthy that the boundary of the section of the beginning of solidification of the weld is rather short; it is disposed on the contour 10 and is actually the boundary of the solidification of the weld.

Of special importance, therefore, is the accuracy of applying maximum pressure of the flux 3 on the section of the beginning of solidification of the weld 8, which must be applied on the boundary of the section of the beginning of solidification of the weld 8, as this considerably affects the quality of molding the weld 8, the more so that the position of this boundary depends on the present welding parameters.

The contour 10 may be shaped, as, for instance, a parabola.

The value of the maximum pressure, established on the basis of the welding conditions, the shape of the joint being welded and the material of the article, must be constant on the entire contour 10, i.e. on the boundary shaped as, for instance, a parabola on the side of the crater on the lower surface of the joint being welded (sheets 1), actually coinciding with the conventional plane 9.

As the melt in the weldpool 6 passes to the solid state, i.e. to the weld 8, the pressure must gradually drop to minimum to mold the weld 8, simultaneously preserving the hardening slag layer, which forms the slag film 12 on the surface of the weld.

Pressure on the layer of the liquid slag fed from the slag bath 7 on the section C of the molding of the weld 8 is exercised through a layer of the flux 3 distributed on the whole section C. This layer of slag fed on the sections B and C serves as a lubricant between the metal of the solidifying weld 8 and the flux layer, partially softened by thermal action, through which pressure is applied.

Such lubricant in the form of a liquid slag layer helps maintain a constant state of the weldpool 6 in performing a given type of overhead welding, without mechanically breaking its equilibrium.

Besides, the pressure on the layer of liquid slag fed from the slag bath 7 on the section C of molding the weld 8 may be exercised through a heat-removing molding surface 13 (FIG. 1).

The layer of liquid slag in this instance also plays the role of a lubricant between the metal of the solidifying weld 8 and the molding surface 13. The heat-removing molding surface 13 speeds up solidification of the weld 8, thereby adding to the capacity of the given method of overhead welding.

Use of the molding surface 13 presupposes that the pressure on the layer of the liquid slag on the section C of molding the weld 8 is exerted without a layer of the flux 3, which makes it possible to obtain high-quality welds of prescribed shapes.

The molding surface 13 is made of a material with a high heat conductivity, e.g. copper.

The molding surface 13 (FIG. 1) has a shaped working surface with the parameters thereof chosen proceeding from the permissible, both in shape and dimensions, weld reinforcement section, the permissible variation in the thickness of the liquid slag layer being fed, and the conditions for passing of the solidifying weld 8 and formation, on both sides of the working surface, of additional spaces to receive surplus flux 3.

To intensify heat removal from the welding zone, the molding surface 13 may be cooled down by, for instance, water or air. Practically, such molding surface 13 may be made with the use of any molding device, e.g. a slider.

With this method of overhead submerged arc welding used, the bulk of the flux 3 is pressure-fed to the zone of formation of the weldpool 6.

Such concentration of the bulk of the flux 3 is essential for steady maintenance of the melt in the weldpool 6 at the level of the lower surface of the welded sheets 1 with the account taken on the compensation for the amount of the flux 3 melting in this high-temperature zone, and for building up and distributing its maximum pressure on the boundary of the section of the beginning of solidification of the weld 8, i.e. on the contour 10.

With this method used, the value of this maximum pressure of the flux 3 is kept constant all along the boundary of solidification of the weld 8.

The necessity for keeping a constant pressure of the flux 3 stems from the requirement to ensure constant conditions for pressing the solidifying weld 8, particularly in the direction of its cross section, and thus to stabilize the prescribed welding conditions, which allows high-quality overhead welds to be obtained within a wide range of technological possibilities (as in the case of downhand submerged arc welding).

In running back-up and single-pass welds with this method of welding used, it is most advantageous to distribute the maximum pressure of the flux 3 on a parabola with the axis of symmetry thereof located in a vertical plane passing through the longitudinal axis of symmetry of the weld 8, as a result of which the maximum pressure is actually applied on the boundary of the section of the beginning of solidification of the weld 8, thus allowing high-quality welded joints to be obtained.

The proposed method is materialized in the following apparatus, which is shown in FIG. 1 as a tentative embodiment thereof.

The apparatus comprises a means 2 for feeding and pressing the flux to the joint being welded from below.

Said means 2 may be any flux-feeding means known in the art, made, for instance, in the form of a screw feeder widely used for the purpose (omitted in FIG. 1).

The apparatus is provided with a welding tip 4 with a consumable electrode 5 located inside the means 2 for feeding and pressing the flux.

Basides, the apparatus incorporates an adjusting plate 14 with a molding surface 13, fitted inside the means 2 for feeding and pressing a flux 3 and adjustable relative to a joint 1. Said adjusting plate 14 regulates the pressure of the flux 3 in the zone of the welded joint.

Figure 4:
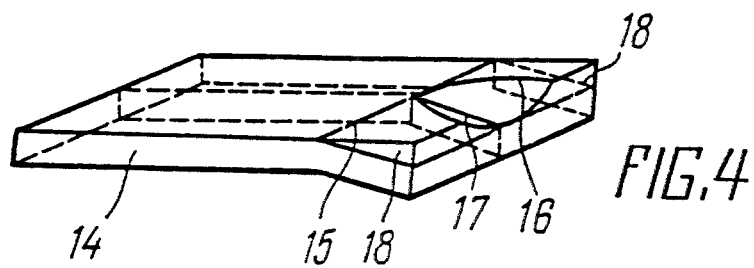
FIG. 4 shows an adjusting plate, an element of construction.

The adjusting plate 14 (FIGS. 3, 4) has a fold, forming a fold line 15. In the process of welding, the fold line 15 of the plate 14 is disposed under the section of the beginning of solidification of a weld 8, forming a gap "f" between the top of the fold of the plate 14 and the weld 8 being molded.

The value of said gap "f" depends on the requisite shape of welds, type of joints, properties of the material being welded and on the welding conditions.

Owing to the arrangement of the fold line 15 of the adjusting plate 14 under the section of the beginning of solidification of the weld 8, maximum pressure of the flux 3 (FIGS. 1, 2) is produced on this section.

The above-mentioned part "a" of the adjusting plate 14, located on the side of a weldpool 6 has a length essentially equal to the length of the weldpool 6; said part "a" is fitted under an angle "α" to the surface of the joint, ensuring the requisite pressure of the flux 3 on the weldpool 6 to keep the latter at the level of the joint being welded.

The foregoing part "b" of the adjusting plate 14 located on the side of the weld 8 being molded extends to the place of final molding of the weld 8; said part "b" is disposed at an angle "β" to the surface of the joint, ensuring pressure on the layer of liquid slag being fed on the section C of molding the weld 8 from the maximum value on the section of the beginning of solidification of the weld 8 to the minimum value on the section of final molding of the weld 8.

For effectively shaping and directing the bulk of the flux 3 to the zone of solidification of the weldpool 6, the portion "a" of the adjusting plate 14 located under the weldpool 6 has a variable-section recess in the longitudinal and transverse profiles with inclined walls. The recess edge 16 facing the weldpool 6 has a contour coinciding with the shape of the contour 10 of solidification of the weldpool 6, i.e. with the shape of the boundary of the section of the beginning of solidification of the weld 8.

In running back-up and single-pass welds on the portion "a" of the adjusting plate 14, it is preferable to make, e.g. by soldering, two wedge-shaped projections 18, contacting each other on a line 17, located on the intersection of the inclined sections "a" and "b" of the adjusting plate 14, i.e. on the fold line 15 of the plate 14.

The wedge-shaped projections 18 have shaped cutouts on their adjacent edges, which form on the working surface of the plate 14 a variable-section recess, e.g. a surface with a cylindrical surface, tangent to the plane of the section "a" of the adjusting plate 14 on its contact line 17.

The cylindrical surface of this recess intersects with the upper planes of the wedge-shaped projections 18 on the edge 16 of the recess, representing a parabola.

The vertex of the parabola is located on the intersection (fold) line 15 of the inclined sections of the adjusting plate 14.

In making root and other types of overhead welds, especially with the use of grooving, recesses and corresponding projections on the adjusting plate 14 may have different shapes, depending on the specific welding conditions.

The dimensions and shapes of such recesses are selected on the basis of the welding mode, shape of the joint (e.g. with or without grooving), the requisite weld reinforcement shape etc.

Structurally, a groove, e.g. one with a cylindrical surface, intersecting with the upper plane of the wedge-shaped projections 18 on the parabola, creates conditions whereat any longitudinal vertical section plane of the working surface of the adjusting plate 14 forms intersection lines disposed at equal angles "α" (FIGS. 1, 3) and whose value is equal to $$\alpha = 180° - (\alpha + \beta)°$$

Such conditions of constant interaction of the working surface of the adjusting plate 14 on the section of the maximum pressure of the flux 3 helps form high-quality welds in general.

Incidentally, the recess on the section "a" of the adjusting plate 14 is disposed under the contour 10 of the tail portion of the weldpool 6 on the side of the crater on the lower surface of the joint being welded, i.e.

under the boundary of the section of solidification of the weld in a manner that the apex of the contour 10 of the beginning of solidification of the weld 8 is under the vertex of the parabola formed by the edges of the recess.

Such mutual position during welding of the contour 10 and the parabola ensure optimum shaping and distribution of a constant prescribed maximum pressure of the flux 3 on the whole boundary of the section of the beginning of solidification of the weldpool 6 and, consequently, improves the quality of welding due to a better reinforcement molding on both sides of the weld 8.

For a more accurate tuning to the prescribed welding mode, the apparatus may be provided with a means for longitudinal displacement of the adjusting plate 14 in the direction of welding (not illustrated). Such a means is preferable in adjusting the distance between the fold line 15 of the adjusting plate and the welding tip 4. Besides, such a means makes it possible to perform welding, strictly observing the requirements made on the method of overhead welding, which contributes to a higher quality of overhead welds in general.

Maximum effect from using the method and apparatus to implement the same, according to the invention, is derived in running back-up and single-pass welds in cases requiring a high quality of molding the reinforcement surface both on the outer and inner sides of the joint being welded (e.g. circumferential welds of reservoirs, pipelines, vessels, housings or longitudinal welds of three-dimensional sections, panels, segments etc.).

On the whole, the apparatus and the method, according to the invention, permit automatic welding of overhead welds with a higher quality of molding the surface of both sides of the welds and a considerably higher capacity of overhead welding than that obtained with the use of prior art devices, and allows high-quality overhead welds to be produced.

We claim:

1. A method of overhead submerged arc welding, comprising the steps of:
   pressure-feeding flux to a joint being welded from below;
   feeding a consumable electrode through the flux from below to the joint being welded;
   striking an arc;
   forming a weldpool;
   welding the joint with subsequent solidification of the weldpool to form a weld;
   molding the weld, the flux being fed at different pressure on different sections along the joint being welded, so that a first section before the arc relative to the weld being formed is fed under a constant prescribed pressure needed to provide conditions for pressuring the weldpool, a second section of arc burning and location of the weldpool is subjected to a pressure through a layer of flux and a layer of liquid slag, which is gradually built up so that maximum pressure of flux is applied to an area of beginning of weld solidifaction, wherein a bulk of the flux is pressure fed to a zone of formation of the weldpool and maximum flux pressure is distributed along a boundary of the area of weld solidification, the maximum flux pressure being maintained constant along the boundary of solidification.

2. A method as claimed in claim 1, wherein, in making back-up and single-pass welds, the maximum flux pressure is distributed essentially on a parabola with an axis of symmetry arranged in a vertical plane passing through a longitudinal axis of symmetry of the weld.

3. An apparatus for implementing a method of overhead submerged arc welding, comprising: a means for feeding and pressing flux to a joint being welded, a welding tip with a consumable electrode, located inside the means for feeding and pressing the flux to the joint being welded, an adjusting plate to produce different pressures on different sections along the joint being welded, adjustable relative to the joint being welded, the adjusting plate on the side of the joint being made in the form of two intersection sections, arranged at an angle to the joint being welded, with an apex thereof located under a section of beginning of weld solidification to produce a maximum flux pressure on said section, a means for longitudinal displacement of the adjusting plate in a direction of welding in order to adjust a distance between a top of the adjusting plate and the welding tip, a section of the adjusting plate located under a weldpool having a variable cross-section recess in transverse and longitudinal profiles with inclined walls to form and direct a flow of flux towards a zone of solidification of weldpool liquid metal, an edge of the recess facing the weldpool having a contour identical with the shape of the boundary of weldpool solidification.

4. An apparatus for implementing a method of overhead submerged arc welding as claimed in claim 3, wherein, for making back-up and single-pass welds, the recess is shaped as a parabola.

5. An apparatus for implementing a method of overhead submerged arc welding as claimed in claim 4, wherein, in making back-up and single-pass welds, two wedge-shaped intersecting projections are fitted on the section of the adjusting plate located under the weldpool, apices of the projections being arranged on the intersection of the inclined sections of the adjusting plate and having shaped cutouts on adjoining edges, forming on a working surface of the adjusting plate a variable cross-section recess with a cylindrical surface, tangent to a plane of said section of the adjusting plate.

* * * * *